United States Patent [19]
Iki

[11] Patent Number: 5,390,303
[45] Date of Patent: Feb. 14, 1995

[54] COMMUNICATIONS SYSTEM RECONFIGURABLE WITH REDUCED NETWORK CONFIGURATION DATA

[75] Inventor: Naohiro Iki, Tokyo, Japan
[73] Assignee: NEC Corporation, Tokyo, Japan
[21] Appl. No.: 230,231
[22] Filed: Apr. 20, 1994

Related U.S. Application Data

[62] Division of Ser. No. 676,971, Mar. 29, 1991, Pat. No. 5,307,465.

[30] Foreign Application Priority Data

Mar. 29, 1990 [JP] Japan .................................. 2-82641

[51] Int. Cl.[6] .............................................. G06F 13/14
[52] U.S. Cl. ............................ 395/325; 364/DIG. 1; 364/222.2; 364/284.4
[58] Field of Search ............... 364/DIG. 1, DIG. 2; 395/209, 250, 325, 275, 800; 340/825.03; 379/220, 221, 269

[56] References Cited

U.S. PATENT DOCUMENTS

| | | | |
|---|---|---|---|
| 4,882,699 | 11/1989 | Evensen | 379/284 |
| 4,887,079 | 12/1989 | Hwang et al. | 340/825.8 |
| 4,899,336 | 2/1990 | Baur et al. | 370/63 |
| 4,991,224 | 2/1991 | Yamamoto et al. | 379/221 |
| 5,058,105 | 10/1991 | Mansour et al. | 370/16 |
| 5,130,974 | 7/1992 | Kawamura et al. | 370/16 |
| 5,138,657 | 8/1992 | Cotton et al. | 379/220 |

FOREIGN PATENT DOCUMENTS

0348331  12/1989  European Pat. Off. .

Primary Examiner—Robert B. Harrell
Attorney, Agent, or Firm—Foley & Lardner

[57] ABSTRACT

In a reconfigurable communications system, circuit status bits are stored in a first matrix of rows associated; respectively, with predefined network configurations and columns associated respectively with predefined circuit configurations. Destination status codes are stored in a second matrix of rows associated, respectively, with the circuit configurations and columns associated respectively with switching nodes of the system. Each circuit configuration comprises one or more transmission links, and each circuit status bit stored in each column of the first matrix pattern indicates the presence or absence of the circuit configuration associated with that column. Each destination status code indicates the presence or absence of transmission links from each switching node to possible destination nodes. In response to a manual command, the circuit status bits stored in one of the rows of the first matrix are respectively multiplied with those of the destination status codes stored in each column of the second matrix. The multiplied binary values are summed, so that network configuration data is derived with respect to a desired network configuration, which is then transmitted to the switching nodes to reconfigure the system. In a modified embodiment, a difference is detected between the network configuration data successively derived with respect to previous and most recent network configurations and transmitted as network configuration signals to the switching nodes.

2 Claims, 12 Drawing Sheets

FIG. 2
CIRCUIT STATUS BITS ($E_{mp}$)

| NETWORK ID (m) | CIRCUITS (p) | | | | | | |
|---|---|---|---|---|---|---|---|
| | 1 | 2 | 3 | 4 | 5 | 6 | 7 |
| 1 | $E_{11}=1$ | $E_{12}=1$ | $E_{13}=0$ | $E_{14}=0$ | $E_{15}=0$ | $E_{16}=0$ | $E_{17}=0$ |
| 2 | $E_{21}=1$ | $E_{22}=0$ | $E_{23}=1$ | $E_{24}=0$ | $E_{25}=1$ | $E_{26}=0$ | $E_{27}=0$ |
| 3 | $E_{31}=1$ | $E_{32}=0$ | $E_{33}=1$ | $E_{34}=1$ | $E_{35}=0$ | $E_{36}=0$ | $E_{37}=0$ |
| 4 | $E_{41}=1$ | $E_{42}=0$ | $E_{43}=0$ | $E_{44}=0$ | $E_{45}=1$ | $E_{46}=1$ | $E_{47}=0$ |
| 5 | $E_{51}=0$ | $E_{52}=0$ | $E_{53}=0$ | $E_{54}=0$ | $E_{55}=0$ | $E_{56}=1$ | $E_{57}=1$ |

FIG. 3
DESTINATION STATUS CODES ($C_{pn}$)

| CIRCUIT ID (p) | SWITCHING NODES (n) | | | | |
|---|---|---|---|---|---|
| | $z_1$ | $z_2$ | $z_3$ | $z_4$ | $z_5$ |
| 1 | $C_{11}$ | $C_{12}$ | $C_{13}$ | $C_{14}$ | $C_{15}$ |
| 2 | $C_{21}$ | $C_{22}$ | $C_{23}$ | $C_{24}$ | $C_{25}$ |
| 3 | $C_{31}$ | $C_{32}$ | $C_{33}$ | $C_{34}$ | $C_{35}$ |
| 4 | $C_{41}$ | $C_{42}$ | $C_{43}$ | $C_{44}$ | $C_{45}$ |
| 5 | $C_{51}$ | $C_{52}$ | $C_{53}$ | $C_{54}$ | $C_{55}$ |
| 6 | $C_{61}$ | $C_{62}$ | $C_{63}$ | $C_{64}$ | $C_{65}$ |
| 7 | $C_{71}$ | $C_{72}$ | $C_{73}$ | $C_{74}$ | $C_{75}$ |

FIG. 4A
CIRCUIT 1 (p=1)

| | | $2_1$ | $2_2$ | $2_3$ | $2_4$ | $2_5$ |
|---|---|---|---|---|---|---|
| | | DESTINATION NODES | | | | |
| $C_{1n}$ | $C_{11}$ | 0 | 1 | 0 | 0 | 0 |
| | $C_{12}$ | 1 | 0 | 0 | 1 | 0 |
| | $C_{13}$ | 0 | 0 | 0 | 0 | 0 |
| | $C_{14}$ | 0 | 1 | 0 | 0 | 0 |
| | $C_{15}$ | 0 | 0 | 0 | 0 | 0 |

FIG. 4B
CIRCUIT 2 (p=2)

| | | $2_1$ | $2_2$ | $2_3$ | $2_4$ | $2_5$ |
|---|---|---|---|---|---|---|
| | | DESTINATION NODES | | | | |
| $C_{2n}$ | $C_{21}$ | 0 | 0 | 0 | 0 | 0 |
| | $C_{22}$ | 0 | 0 | 0 | 0 | 0 |
| | $C_{23}$ | 0 | 0 | 0 | 0 | 1 |
| | $C_{24}$ | 0 | 0 | 0 | 0 | 1 |
| | $C_{25}$ | 0 | 0 | 1 | 1 | 0 |

FIG. 4C
CIRCUIT 3 (p=3)

| | | $2_1$ | $2_2$ | $2_3$ | $2_4$ | $2_5$ |
|---|---|---|---|---|---|---|
| | | DESTINATION NODES | | | | |
| $C_{3n}$ | $C_{31}$ | 0 | 0 | 0 | 0 | 0 |
| | $C_{32}$ | 0 | 0 | 1 | 0 | 1 |
| | $C_{33}$ | 0 | 1 | 0 | 0 | 0 |
| | $C_{34}$ | 0 | 0 | 0 | 0 | 0 |
| | $C_{35}$ | 0 | 1 | 0 | 0 | 0 |

FIG. 4D
CIRCUIT 4 (p=4)

| | | $2_1$ | $2_2$ | $2_3$ | $2_4$ | $2_5$ |
|---|---|---|---|---|---|---|
| | | DESTINATION NODES | | | | |
| $C_{4n}$ | $C_{41}$ | 0 | 0 | 0 | 1 | 0 |
| | $C_{42}$ | 0 | 0 | 0 | 0 | 0 |
| | $C_{43}$ | 0 | 0 | 0 | 0 | 0 |
| | $C_{44}$ | 1 | 0 | 0 | 0 | 0 |
| | $C_{45}$ | 0 | 0 | 0 | 0 | 0 |

FIG. 4E
CIRCUIT 5 (p=5)

| | | DESTINATION NODES | | | | |
|---|---|---|---|---|---|---|
| | | $2_1$ | $2_2$ | $2_3$ | $2_4$ | $2_5$ |
| | $C_{51}$ | 0 | 0 | 0 | 0 | 0 |
| | $C_{52}$ | 0 | 0 | 0 | 0 | 0 |
| $C_{5n}$ | $C_{53}$ | 0 | 0 | 0 | 0 | 1 |
| | $C_{54}$ | 0 | 0 | 0 | 0 | 0 |
| | $C_{55}$ | 0 | 0 | 1 | 0 | 0 |

12E

FIG. 4F
CIRCUIT 6 (p=6)

| | | DESTINATION NODES | | | | |
|---|---|---|---|---|---|---|
| | | $2_1$ | $2_2$ | $2_3$ | $2_4$ | $2_5$ |
| | $C_{61}$ | 0 | 0 | 1 | 0 | 0 |
| | $C_{62}$ | 0 | 0 | 0 | 0 | 0 |
| $C_{6n}$ | $C_{63}$ | 1 | 0 | 0 | 0 | 0 |
| | $C_{64}$ | 0 | 0 | 0 | 0 | 0 |
| | $C_{65}$ | 0 | 0 | 0 | 0 | 0 |

12F

FIG. 4G
CIRCUIT 7 (p=7)

| | | DESTINATION NODES | | | | |
|---|---|---|---|---|---|---|
| | | $2_1$ | $2_2$ | $2_3$ | $2_4$ | $2_5$ |
| | $C_{71}$ | 0 | 0 | 0 | 0 | 1 |
| | $C_{72}$ | 0 | 0 | 0 | 0 | 0 |
| $C_{7n}$ | $C_{73}$ | 0 | 0 | 0 | 0 | 0 |
| | $C_{74}$ | 0 | 0 | 0 | 0 | 0 |
| | $C_{75}$ | 1 | 0 | 0 | 0 | 0 |

NETWORK 1 (m=1)
(p=1, p=2)

| | | \[13A\] DESTINATION NODES | | | | |
|---|---|---|---|---|---|---|
| | | $2_1$ | $2_2$ | $2_3$ | $2_4$ | $2_5$ |
| $N_{1n}$ | $N_{11}$ | 0 | 1 | 0 | 0 | 0 |
| | $N_{12}$ | 1 | 0 | 0 | 1 | 0 |
| | $N_{13}$ | 0 | 0 | 0 | 0 | 1 |
| | $N_{14}$ | 0 | 1 | 0 | 0 | 1 |
| | $N_{15}$ | 0 | 0 | 1 | 1 | 0 |

FIG. 7B

NETWORK 2 (m=2)
(p=1, p=3, p=5)

| | | \[13B\] DESTINATION NODES | | | | |
|---|---|---|---|---|---|---|
| | | $2_1$ | $2_2$ | $2_3$ | $2_4$ | $2_5$ |
| $N_{2n}$ | $N_{21}$ | 0 | 1 | 0 | 0 | 0 |
| | $N_{22}$ | 1 | 0 | 1 | 1 | 1 |
| | $N_{23}$ | 0 | 1 | 0 | 0 | 1 |
| | $N_{24}$ | 0 | 1 | 0 | 0 | 0 |
| | $N_{25}$ | 0 | 1 | 1 | 0 | 0 |

FIG. 7C

NETWORK 3 (m=3)
(p=1, p=3, p=4)

| | | \[13C\] DESTINATION NODES | | | | |
|---|---|---|---|---|---|---|
| | | $2_1$ | $2_2$ | $2_3$ | $2_4$ | $2_5$ |
| $N_{3n}$ | $N_{31}$ | 0 | 1 | 0 | 1 | 0 |
| | $N_{32}$ | 1 | 0 | 1 | 1 | 1 |
| | $N_{33}$ | 0 | 1 | 0 | 0 | 0 |
| | $N_{34}$ | 1 | 1 | 0 | 0 | 0 |
| | $N_{35}$ | 0 | 1 | 0 | 0 | 0 |

COMMUNICATIONS SYSTEM RECONFIGURABLE WITH REDUCED NETWORK CONFIGURATION DATA

This application is a division of application Ser. No. 07/676,971, filed Mar. 29, 1991, now U.S. Pat. No. 5,307,465.

BACKGROUND OF THE INVENTION

The present invention relates generally to communications systems and, more specifically, to a reconfigurable communications system in which switching nodes are interconnectable by transmission links according to network configuration signals supplied from a network control center.

According to conventional reconfigurable communications systems, the network control center is provided with a memory in which network configuration data are stored in a matrix pattern of rows and columns so that the rows correspond respectively to predefined network configurations and the columns correspond respectively to switching nodes of the system. When the system traffic is imbalanced due to varying user's communications needs a varying community of interest, a command is entered to a management console specifying one of the predefined network configurations which is selected as the best for balancing the system's traffic. The network configuration data corresponding to the selected configuration is retrieved from the memory and sent to the switching nodes to reconfigure the network.

However, there is a wide range of user's needs. To meet the varying user's demands many network configurations must be predefined, and, hence, a large capacity memory is required for storing corresponding network configuration data to achieve a high level of flexibility. In addition, during the network reconfiguration phases, each switching node clears all of its static connections in response to the signal from the network control center before it establishes new static connections. However, this increases the burden of the controller of each switching node.

SUMMARY OF THE INVENTION

It is therefore an object of the present invention to reduce the amount of data to be stored in a network management memory necessary for network configuration.

This object is obtained by factoring network configuration data into first component data and second component data, storing the first and second component data into memory and multiplying appropriate first and second component data to obtain desired network configuration data for transmission to switching nodes.

Specifically, the present invention provides a communications system having a plurality of switching nodes, each being capable of establishing and removing relatively static connections between transmission links in response to network configuration signals and of establishing relatively dynamic connections through the established static connections in response to information pertaining to call-by-call connection requests from user terminals, wherein the system includes a network control center having a management console to which a command is entered as an indication of a desired one of a plurality of predefined network configurations. Circuit status bits (first component data) are stored in a first matrix pattern of rows associated respectively with the predefined network configurations and columns associated respectively with predefined circuit configurations, and destination status codes (second component data) are stored in a second matrix pattern of rows associated respectively with the circuit configurations and columns associated respectively with the switching nodes, each of the circuit configurations comprising one or more transmission links. Each of the bits stored in each column of the first matrix pattern indicates the presence or absence of the circuit configuration associated with the column of the first matrix pattern, and each of the codes indicates the presence or absence of transmission links from each switching node to possible destination nodes. In response to a command entered to the management console, the binary values of those of the circuit status bits stored in one of the rows of the first matrix pattern are respectively multiplied with binary values of those of the destination status codes stored in each column of the second matrix pattern, and the multiplied binary values are summed so that network configuration data is derived with respect to a desired network configuration. The network configuration data is then transmitted to the switching nodes to reconfigure the system.

Another object of this invention is to reduce the burden taken by each switching node of the system during a network reconfiguration phase.

This object is attained by detecting a difference between first and second network configuration data corresponding respectively to existing and most recent network configurations and transmitting the difference as a network configuration signal to switching nodes.

More specifically, the present invention provides a communications system having a plurality of switching nodes, each being capable of establishing and removing relatively static connections between transmission links in response to network configuration signals and of establishing relatively dynamic connections through the established static connections in response to information pertaining to call-by-call connection requests from user terminals, wherein the system includes a network control center having a management console to which a command is entered as an indication of a desired one of a plurality of predefined network configurations. According to a second aspect of the present invention, circuit status bits are stored in a first matrix pattern of rows associated respectively with the predefined network configurations and columns associated respectively with predefined circuit configurations, and destination status codes are stored in a second matrix pattern of rows associated respectively with the circuit configurations and columns associated respectively with the switching nodes. Each of the circuit configurations comprises one or more transmission links, and each of the bits stored in each column of the first matrix pattern indicates the presence or absence of the circuit configuration associated with the column of the first matrix pattern, and each of the codes indicates the presence or absence of transmission links from each switching node to possible destination nodes. In response to a command entered in the management console, the circuit status bits are retrieved from one of the rows of the first matrix pattern and the destination status codes are retrieved from each column of the second matrix pattern, and the binary values of the retrieved circuits status bits are multiplied with the binary values of the retrieved destination status codes and the multiplied binary values are summed to derive network configuration data associated with a first network configuration. In response to a second command entered to the management console, a similar process is repeated to to derive network configuration data associated with a second network configuration. A difference is detected between the network configuration data successively derived with respect to the first and second network configurations and transmitted as network configuration signals to the switching nodes.

According to a modification, the circuit status bits are retrieved from each row of the first matrix pattern and the destination status codes are retrieved from each column of the second matrix pattern. The binary values of the retrieved circuits status bits are respectively multiplied with the binary values of the retrieved destination status codes, the multiplied binary values being summed together to derive network configuration data for each of the predefined network configurations. The network configuration data derived for the predefined network configurations are stored into a memory. In response to a command entered to the console, a pair of first and second network configuration data are retrieved from the memory, with the first network configuration data being associated with a most recent network configuration and the second network configuration data being associated with a previous network configuration. A difference between the network configuration data of the pair is detected and transmitted as the network configuration signals to the switching nodes.

According to further modifications, a plurality of network configuration data corresponding respectively to distinct network configurations are stored in a memory and first and second network configuration data corresponding respectively to an existing network configuration and a most recent network configuration are retrieved from the memory. A determination is made if there is a difference between the first and second network configuration data. The second network configuration data is sent to switching nodes as network configuration signals if it is determined there is a difference between the first and second network configuration data. A code indicative of such a difference may be detected and transmitted, instead of the second network configuration data, to only those switching nodes requiring network reconfiguration.

BRIEF DESCRIPTION OF THE DRAWINGS

The present invention will be described in further detail with reference to the accompanying drawings, in which.

DETAILED DESCRIPTION

Figure 1:
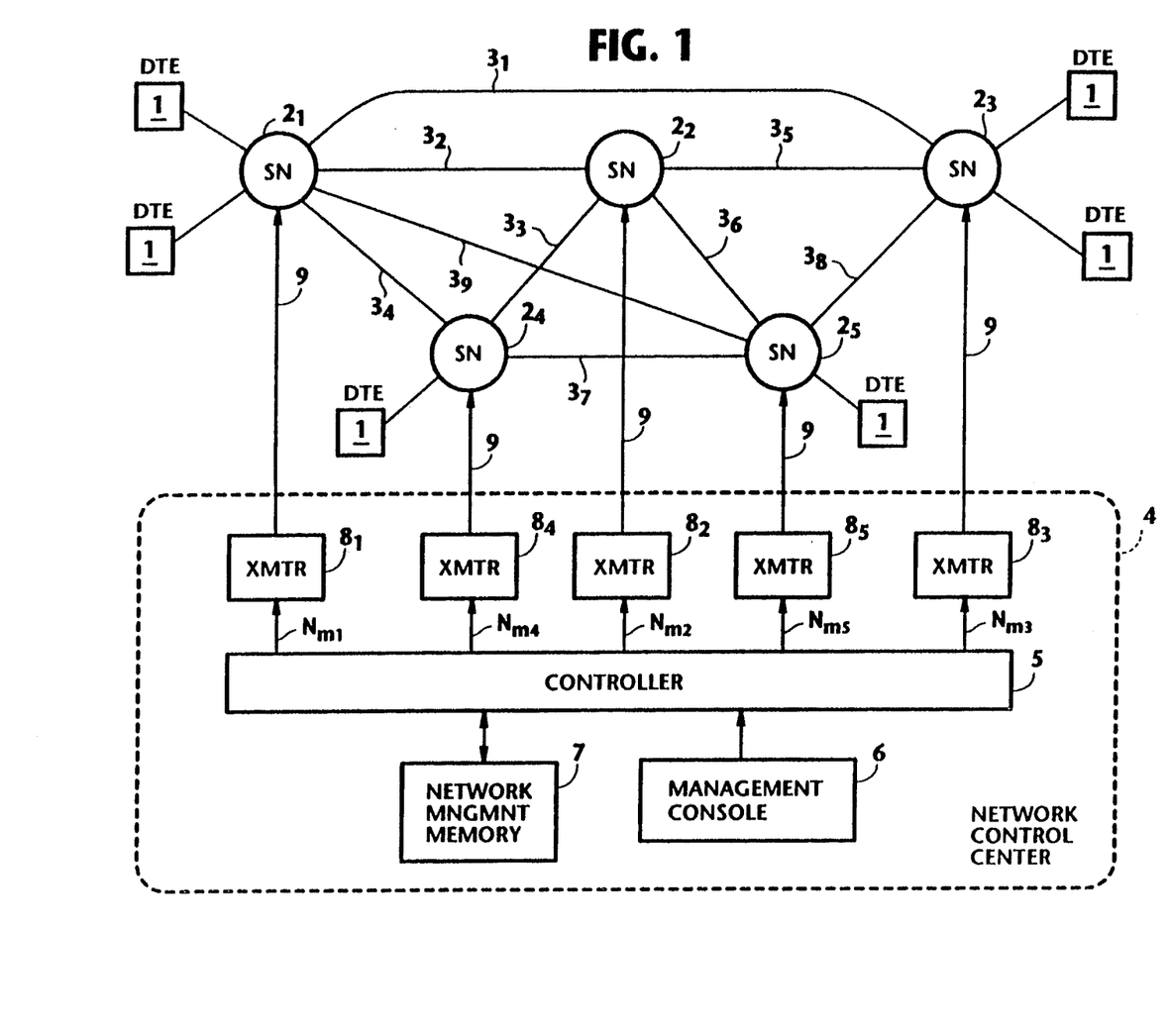
FIG. 1 shows in block form a communications network having a network control center according to the present invention.

Referring now to FIG. 1, there is shown a communications network according to the present invention. The network is made up of a plurality of switching nodes 2 for servicing user's data terminals 1. For purposes of disclosure, five switching nodes $2_1$ through $2_5$ are shown interconnected by full-duplex transmission links $3_1$ through $3_9$. A network controller 4 is provided for setting up relatively static connections between switching nodes of the system by entering commands at a management console.

Each switching node has a digital switching matrix that responds to signaling information from the user terminals pertaining to call-by-call connection requests by establishing a circuit-switched connection or a packet-switched connection, depending on the mode of operation of the network. To permit instant reconfiguration of the network, each switching node has a digital cross-connect function that responds to a network configuration signal from the network control center 4 by establishing a relatively static connections to one or more switching nodes.

Network control center 4 is made up of a network controller 5, a management console 6, a network management memory 7, and transmitters $8_1$-$8_5$ which are associated respectively with switching nodes $2_1$-$2_5$ through respective control channels 9. As will be described, when a traffic imbalance occurs in the network, manual command input is supplied from console 6 to controller 5, indicating a network identifier (m) which reconfigures the original configuration to eliminate the traffic imbalance (where m is an identifier uniquely indicating a particular network configuration). In response to this signal, controller 5 searches through the memory 7 and generates network configuration data ($N_{mn}$) for each switching node $2_n$ and applies it to a corresponding transmitter $8_n$ in which it is converted into a format indicating a sequence of destination nodes or link identifiers followed by a 0 or a 1 indicating respectively the provisioning or disconnecting of a link to a destination.

The communications network of this invention comprises a plurality of circuit configurations. For purposes of disclosure, seven different circuit configurations and five different network configurations are predetermined, and more than one circuit configuration is chosen from the seven circuit configurations for each of the five network configurations.

Figure 2:
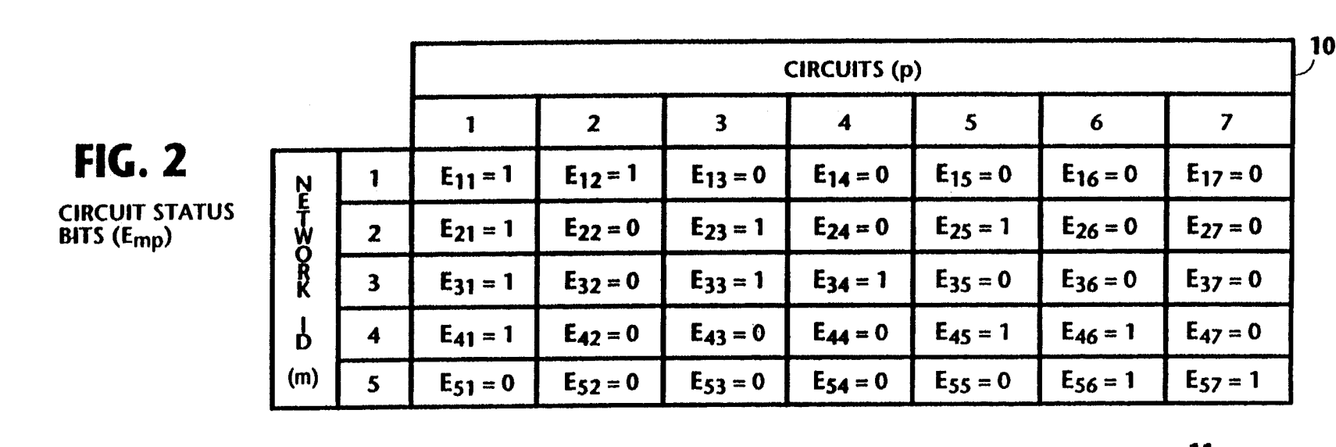
FIG. 2 shows a list of circuit status bits stored in memory in a matrix format tabulated according to network configurations and circuit configurations.

In the network management memory 7 is stored a circuit configuration table 10 as shown in FIG. 2. Circuit configuration table 10 is a list of circuit status bits ($E_{mp}$), where p identifies a particular circuit configuration. Each circuit status bit $E_{mp}$ is either a binary 1 indicating the presence of a circuit configuration or a binary 0 indicating the absence of any circuits. A unique set of $E_{mp}$ bits is assigned to each network configuration. A network configuration m=1, for example, is assigned a set of bits $E_{11}$, $E_{12}$, $E_{13}$, $E_{14}$, $E_{15}$, $E_{16}$ and $E_{17}$, which are respectively, "1", "1", "0", "0", "0", "0" and "0". Therefore, network configuration m=1 is made up of circuit configurations p=1 and p=2, and a network configuration m=2 is assigned a set of bits circuit status bits $E_{21}$, $E_{22}$, $E_{23}$, $E_{24}$, $E_{25}$, $E_{26}$ and $E_{27}$, which are respectively, "1", "0", "1", "0", "1", "0" and "0". Therefore, network configuration m=2 is made up of circuit configurations p=1, p=3 and p=5.

Figure 3:
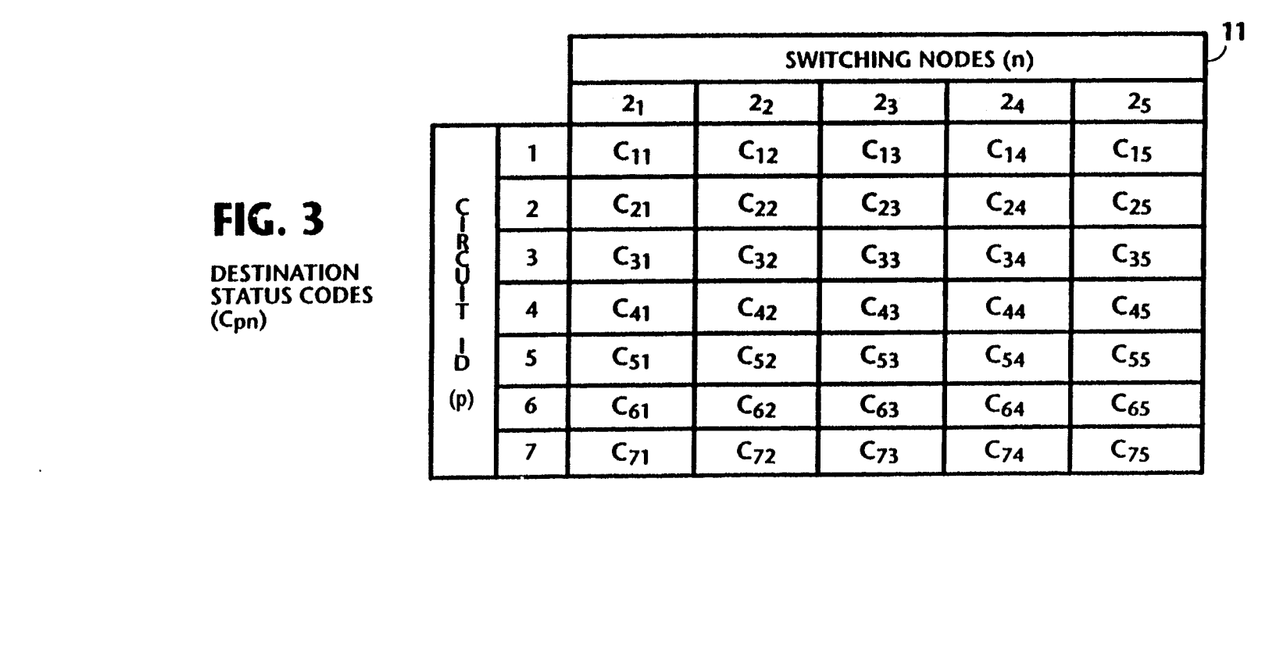
FIG. 3 shows a list of destination status codes stored in the memory in a matrix format tabulated according to circuit configurations and switching nodes.

As shown in FIG. 3, the circuit configurations are represented by a destination status channel table 11 which is stored in the network management memory. Each of the seven circuit configurations is identified by a set of destination status codes $C_{pn}$ which correspond respectively to switching nodes $2_n$. For example, circuit configuration p=1 is given by a set of codes $C_{11}$, $C_{12}$, $C_{13}$, $C_{14}$ and $C_{15}$ and circuit configuration p=2 is represented by a set of codes $C_{21}$, $C_{22}$, $C_{23}$, $C_{24}$ and $C_{25}$.

Details of the destination status codes will be described with reference to FIGS. 4A~4G.

Figure 4A:
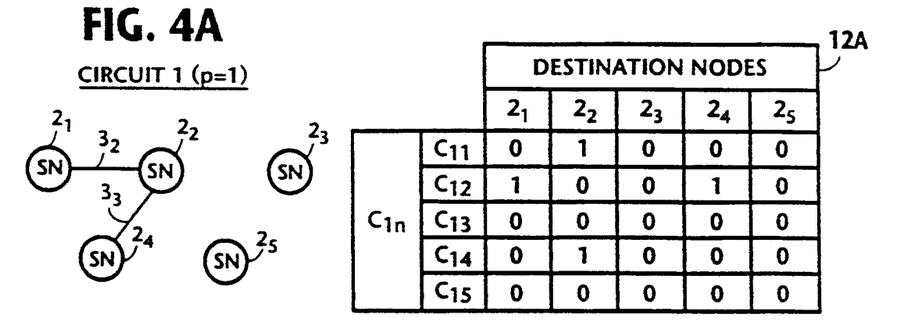
FIGS. 4A, 4B, 4C, 4D, 4E, 4F and 4G show the contents of the destination status codes of respective circuit configurations stored in the memory in a matrix format tabulated according to source and destination switching nodes.

Circuit configuration p=1 is formed by link $3_2$ between nodes $2_1$ and $2_2$ and link $3_3$ between nodes $2_2$ and $2_4$ (FIG. 4A). A list of codes $C_{1n}$ (where n=1, 2, ... 5) is given in a table 12A which indicates the destination status of circuit configuration p=1. A binary 1 in the destination status codes indicates the presence of a link from a source node to a destination node which is specified by the position of the bit in the code and a binary 0 indicates the absence of such a link. In this case, code $C_{11}$ for source node $2_1$ is "01000", indicating that there is a link available between nodes $2_1$ and $2_2$. Likewise, code $C_{12}$ for source node $2_2$ is represented by "10010", indicating that links are available between node $2_2$ and node $2_1$ and between nodes $2_2$ and $2_4$. Code $C_{14}$ for source node $2_4$ is represented by "01000", indicating that a link is available between nodes $2_4$ and $2_2$. The other codes $C_{13}$ and $C_{15}$ are represented by all zeros indicating no links are available for switching nodes $2_3$ and $2_5$.

Figure 4B:
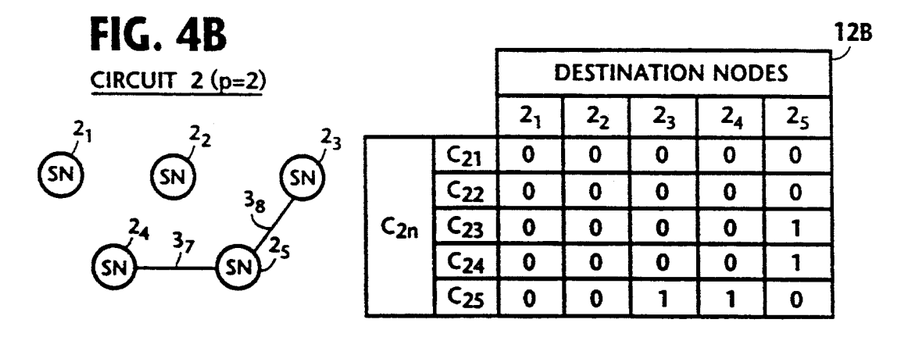
Figure 4C:
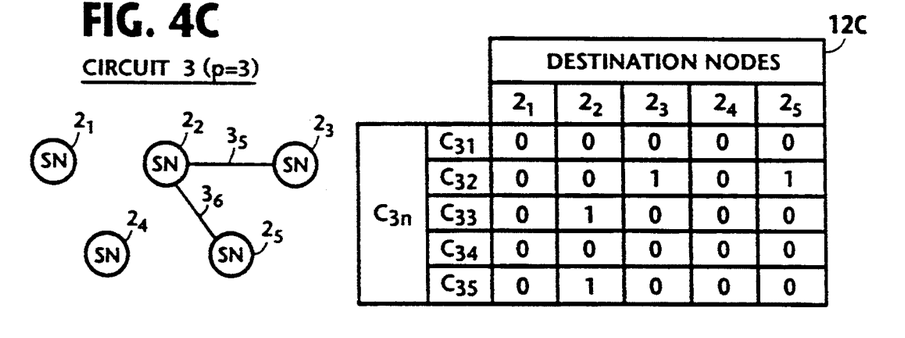
Figure 4D:
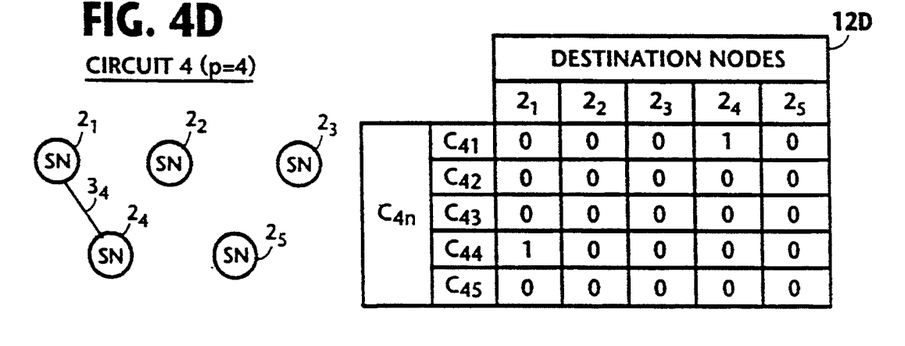
Figure 4E:
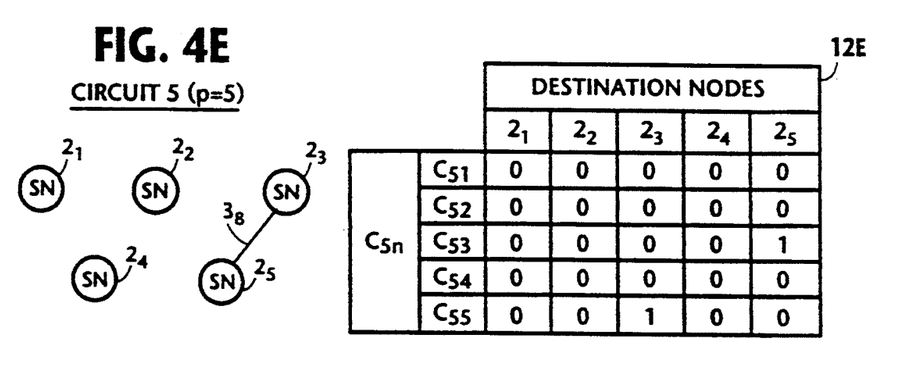
Figure 4F:
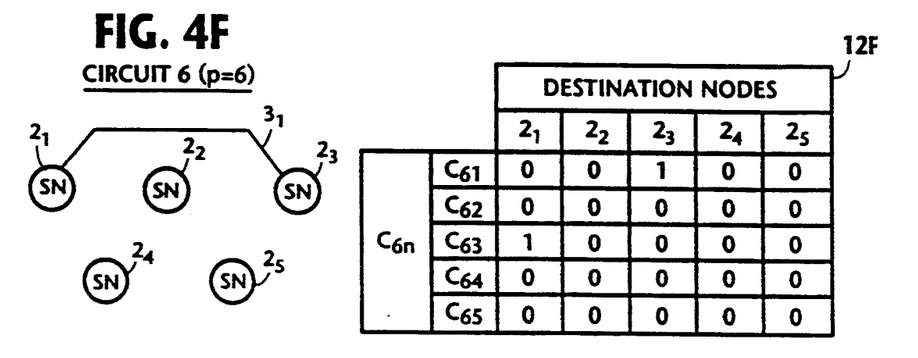
Figure 4G:
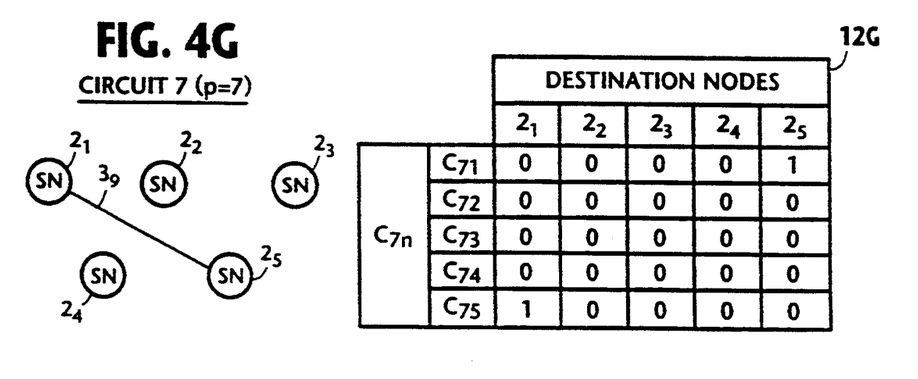

In like manner, circuit configuration p=2 is formed by link $3_7$ between nodes $2_4$ and $2_5$ and link $3_8$ between nodes $2_3$ and $2_5$ (FIG. 4B). A list of codes $C_{2n}$ is given in table 12B, indicating the destination status of circuit configuration p=2. Circuit configuration p=3 is formed by link $3_5$ between nodes $2_2$ and $2_3$ and link $3_6$ between nodes $2_2$ and $2_5$ (FIG. 4C). A table 12C contains a list of codes $C_{3n}$ for the destination status of circuit configuration p=3. Circuit configuration p=4 is formed by link $3_4$ between nodes $2_1$ and $2_4$ (FIG. 4D). A list of codes $C_{4n}$ for the destination status of circuit configuration 4 is given in table 12D. Circuit configuration p=5 is formed by link $3_8$ between nodes $2_3$ and $2_5$ (FIG. 4E). A list of codes $C_{5n}$ for the destination status of circuit configuration 5 is given in table 12E. Circuit configuration p=6 is formed by link $3_1$ between nodes $2_1$ and $2_3$. (FIG. 4F). A list of codes $C_{6n}$ for the destination status of circuit configuration 4 is given in table 12F. Finally, circuit configuration p=7 is formed by link $3_9$ between nodes $2_1$ and $2_5$ (FIG. 4G). A list of codes $C_{7n}$ for the destination status of circuit configuration p=7 is given in table 12G. Tables 12A-12G are stored in memory 7.

Figure 5:
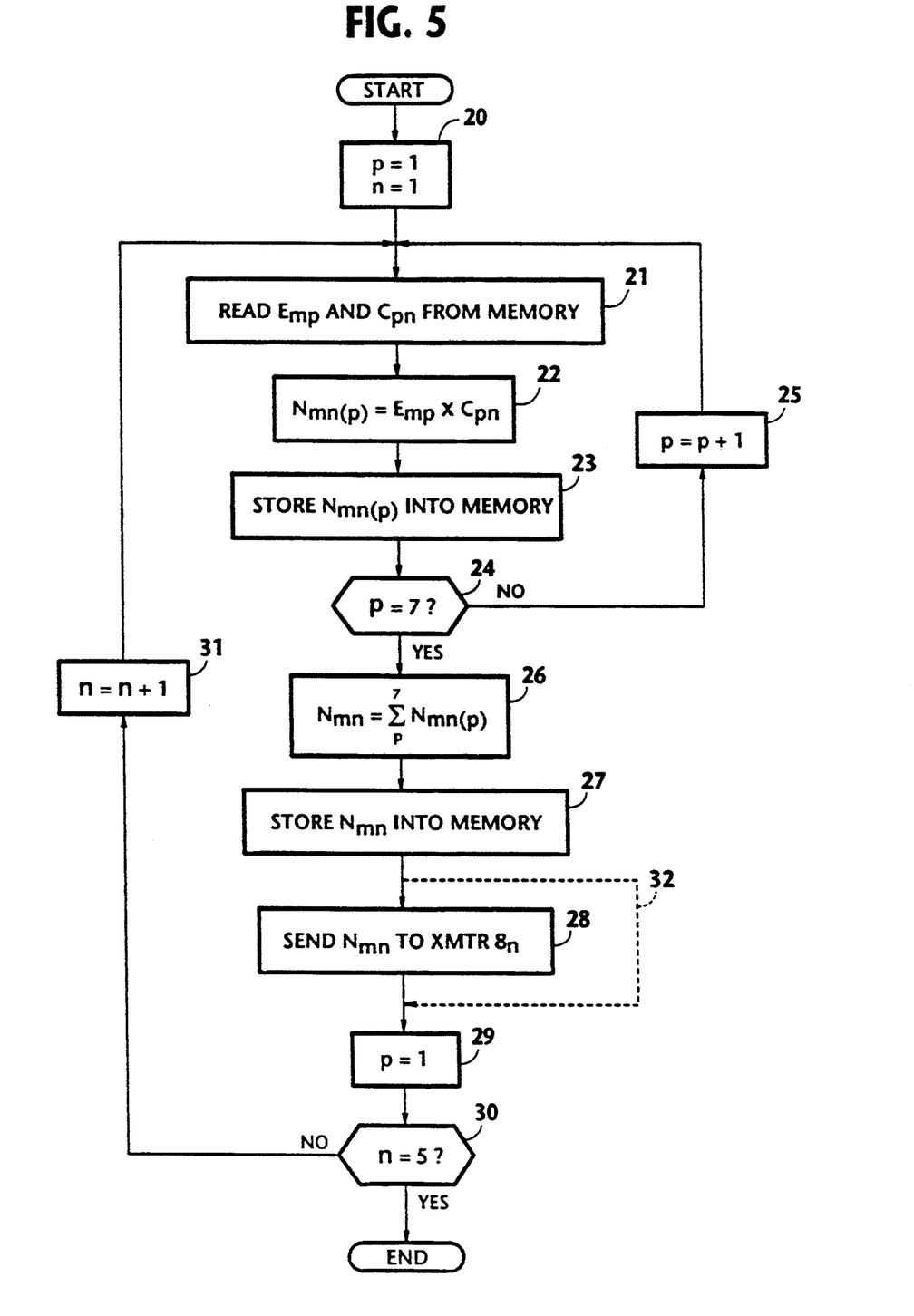
FIG. 5 shows in flowchart a sequence of programmed instructions performed by the controller of FIG. 1 according to an embodiment of the present invention.

FIG. 5 is a flowchart describing a sequence of programmed instructions which are executed by network controller 5 according to one embodiment of the present invention for deriving network configuration data $N_{mn}$ from the circuit status bits $E_{mp}$ and destination status code $C_{pn}$ just described. Network configuration data $N_{mn}$ is represented as follows:

$$N_{mn} = \sum_{i=1}^{7} E_{mi} C_{in}$$

The program is activated in response to a signal from management console 6 when a network identifier m is determined for reconfiguring an existing configuration. Program execution starts with step 20 in which variables p and n are both reset to 1. Exit then is to step 21 which directs the reading of circuit status bits $E_{mp}$ and destination status codes $C_{pn}$ from memory 7 using variables m, p and n as address pointers. Control proceeds to step 22 in which circuit status bits $E_{mp}$ are multiplied with destination status codes $C_{pn}$. Assume that if m is determined to be equal to 1, $E_{11}$ and $C_{11}$ are fetched from memory 7 and multiplied together to produce a product $N_{mn(i)}$. Since $E_{11}=1$ and $C_{11}=01000$, $N_{11(1)}$ is equal to 01000 (see FIGS. 2 and 4A). Control advances to step 23 to store $N_{mn(p)}$ into memory 7, and moves to decision step 24 to determine if p is equal to the total number of the circuit configurations, i.e., 7. If the answer is negative, control goes to step 25 in which p is incremented by 1, with control returning to step 21 to repeat steps 22 and 23. Therefore, in the second pass through steps 22 and 23, $N_{11(2)}=E_{12}\times C_{21}=1\times 00000=00000$ is obtained (FIGS. 2 and 4B). In this way, the following relations are obtained for switching node $2_1$ as steps 22 and 23 are executed seven times:

$N_{11(1)}=E_{11}\times C_{11}=1\times 01000=01000$ (FIGS. 2,4A)

$N_{11(2)}=E_{12}\times C_{21}=1\times 00000=00000$ (FIGS. 2,4B)

$N_{11(3)}=E_{13}\times C_{31}=0\times 00010=00000$ (FIGS. 2,4C)

$N_{11(4)}=E_{14}\times C_{41}=0\times 00010=00000$ (FIGS. 2,4D)

$N_{11(5)}=E_{15}\times C_{51}=0\times 01010=00000$ (FIGS. 2,4E)

$N_{11(6)}=E_{16}\times C_{61}=0\times 00000=00000$ (FIGS. 2,4F)

$N_{11(7)}=E_{17}\times C_{71}=0\times 00000=00000$ (FIGS. 2,4G)

If an affirmative decision is made in step 24, control exits to step 26 to give a total ($N_{11}$) of the $N_{11(1)}$ through $N_{11(7)}$ values, which is equal to 01000. Network configuration data $N_{11}$ obtained at step 26 is stored into a most recent data storage location of memory 7 (step 27).

Exit then is to step 28 in which controller 5 applies $N_{11}$ to transmitter $8_1$, which, in turn, transmits this data as a network configuration signal to switching node $2_1$. Control proceeds to step 29 to reset p to 1 and moves to step 30 to check to see if n is equal to the total number of switching nodes, i.e., 5. If the answer is negative, control moves to step 31 to increment n by 1 and returns to step 21 to repeat the process for switching nodes $2_2$ through $2_5$ to obtain the following network configuration data $N_{12}$, $N_{13}$, $N_{14}$ and $N_{15}$.

$$N_{12} = \Sigma E_{1p} C_{i2}$$
$$= E_{11} C_{12} + E_{12} C_{22} + E_{13} C_{32} + E_{14} C_{42} + E_{15} C_{52} + E_{16} C_{62} + E_{17} C_{72}$$
$$= C_{12} + C_{22}$$
$$= 10010 + 00000$$
$$= 10010$$

$$N_{13} = \Sigma E_{1p} C_{i3}$$
$$= E_{11} C_{13} + E_{12} C_{23}$$
$$= 00000 + 00001$$
$$= 00001$$

$$N_{14} = \Sigma E_{1p} C_{i4}$$
$$= E_{11} C_{14} + E_{12} C_{24}$$
$$= 01000 + 00001$$
$$= 01001$$

$$N_{15} = \Sigma E_{1p} C_{i5}$$
$$= E_{11} C_{15} + E_{12} C_{25}$$
$$= 00000 + 00110$$
$$= 00110$$

If the decision is affirmative at step 30, control terminates the program execution.

Figure 7A:
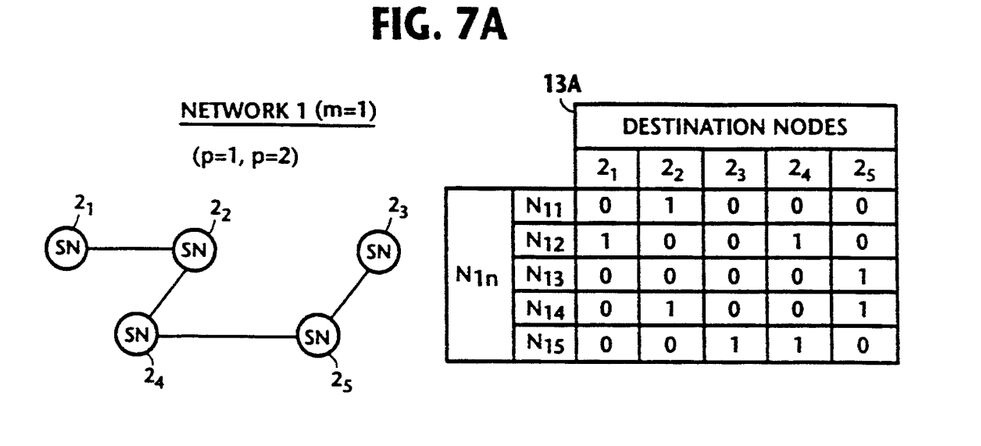
FIGS. 7A, 7B, 7C, 7D and 7E show in matrix form network configuration data of predefined network configurations stored in locations of the memory accessible as a function of network identifiers and switching node identifiers.

Therefore, network configuration signals $N_{12}$ through $N_{15}$ are transmitted to switching nodes $2_2 \sim 2_5$, respectively, from transmitters $8_2 \sim 8_5$, to configure the communications network as shown in FIG. 7A, which is a combination of circuit configurations p=1 and p=2. A list of network configuration data $N_{11}$–$N_{15}$ is tabulated as shown in a table 13A.

It is seen that the amount of data to be stored in network management memory 7 is significantly reduced and hence a wide range of network configurations can be accommodated, providing a high level of system flexibility.

Figure 6:
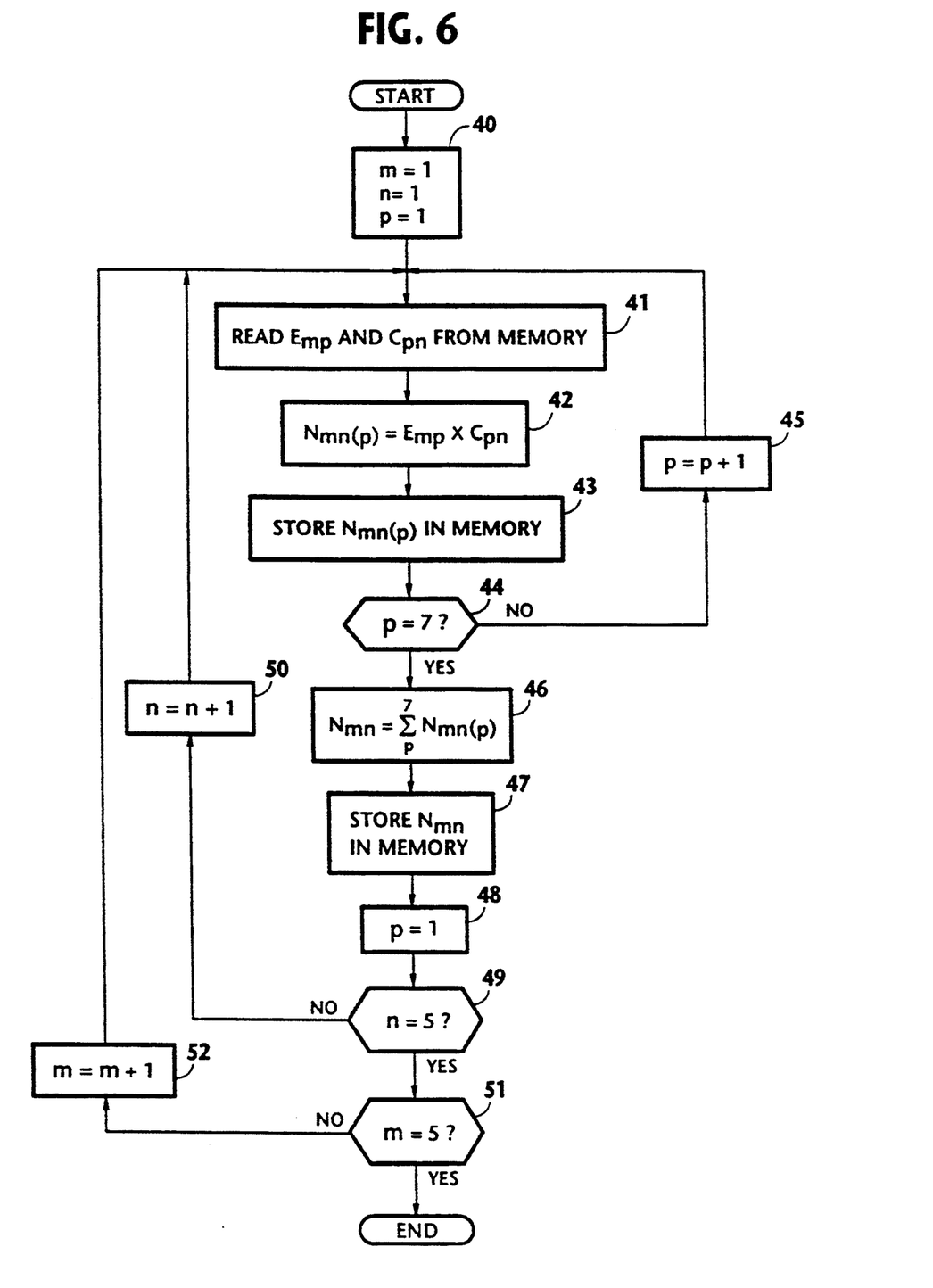
FIG. 6 shows programmed instructions performed by the controller according to a modified embodiment of the present invention.

FIG. 6 is a flowchart according to another embodiment of this invention, in which network configuration data for networks with identifiers m=1 through m=5 are prepared in advance and stored in memory 7 for later retrieval. Program execution begins with step 40, which initializes variables m, p and n by resetting them each to 1. Exit then is to step 41 to read $E_{mp}$ and $C_{pn}$, using variables m, p and n as address pointers. Data $E_{mp}$ and $C_{pn}$ are then multiplied together to obtain $N_{mn(p)}$ (step 42), which is stored into memory 7 (step 43). Variable p is checked to see if p=7 (step 44). If the answer is negative, p is incremented by 1 (step 45) and steps 41 to 43 are repeated, so that $N_{11(1)}$ through $N_{11(7)}$ are stored into memory 7.

With the answer being affirmative in step 44, control exits to step 46 to give a total sum $N_{11}$ of the $N_{11(1)}$ through $N_{11(7)}$ values. Exit then is to step 47 to store $N_{11}$ into memory 7 as network configuration data for switching node $2_1$. Variable p is then reset to 1 (step 48) and variable n is checked to see if it equals the total number of switching nodes (step 49). If the answer is negative, n is incremented by 1 (step 50) and steps 41 through 48 are repeated for switching nodes $2_2$ through $2_5$. In this way, $N_{11}$ through $N_{15}$ are stored in memory 7 as table 13A (FIG. 7A) for a network configuration m=1.

Exit then is to step 51 which checks to see if m=5. If the answer is negative, m is incremented by 1 (step 52), and steps 41 to 49 are repeated again to produce $N_{21}$ through $N_{25}$ for switching nodes $2_1$ through $2_5$, respectively, which are connected in a network configuration identified with m=2, which is formed by circuit configurations 3 and 4.

Figure 7B:
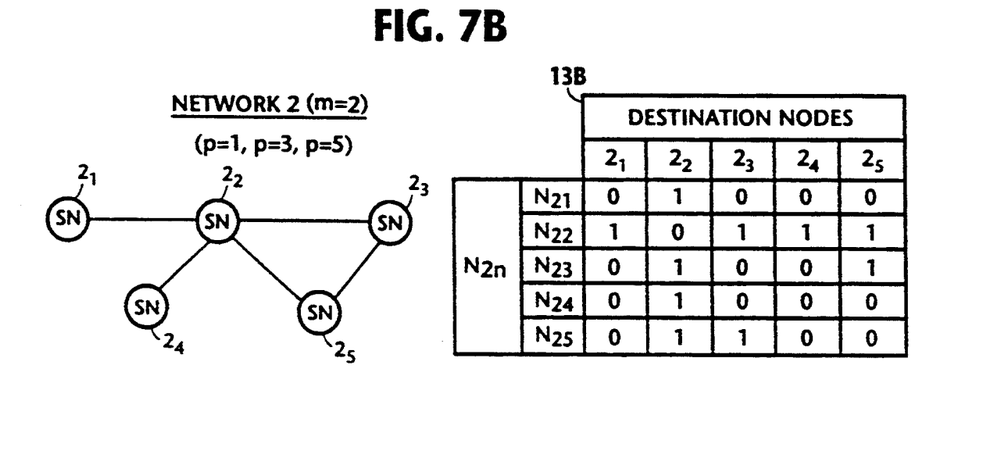

More specifically, network configuration data $N_{21}$ through $N_{25}$ are obtained by the following calculations and stored in table 13B (FIG. 7B):

$$N_{21} = \Sigma E_{2p} C_{p1}$$
$$= E_{21} C_{11} + E_{22} C_{21} + E_{23} C_{31} + E_{24} C_{41} + E_{25} C_{51} + E_{26} C_{61} + E_{27} C_{71}$$
$$= C_{11} + C_{31} + C_{51}$$
$$= 01000 + 00000 + 00000$$
$$= 01000$$

$$N_{22} = \Sigma E_{2p} C_{p2}$$
$$= C_{12} + C_{32} + C_{52}$$
$$= 10010 + 00101 + 00000$$
$$= 10111$$

$$N_{23} = \Sigma E_{2p} C_{p3}$$
$$= C_{13} + C_{33} + C_{53}$$
$$= 00000 + 01000 + 00001$$
$$= 01001$$

$$N_{24} = \Sigma E_{2p} C_{p4}$$
$$= C_{14} + C_{34} + C_{54}$$
$$= 01000 + 00000 + 00000$$
$$= 01000$$

$$N_{25} = \Sigma E_{2p} C_{p5}$$
$$= C_{15} + C_{35} + C_{55}$$
$$= 00000 + 01000 + 00100$$
$$= 01100$$

Figure 7C:
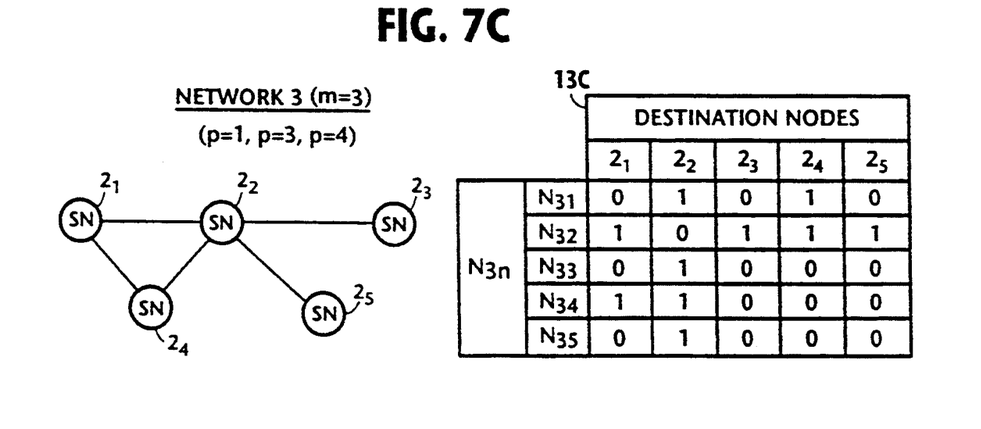

With m=3, network configuration data $N_{31}$ through $N_{35}$ are obtained by the following calculations and stored in table 13C (FIG. 7C):

$$N_{31} = \Sigma E_{3p} C_{p1}$$
$$= E_{31} C_{11} + E_{32} C_{21} + E_{33} C_{31} + E_{34} C_{41} + E_{35} C_{51} + E_{36} C_{61} + E_{37} C_{71}$$
$$= C_{11} + C_{31} + C_{41}$$
$$= 01000 + 00000 + 00010$$
$$= 01010$$

$$N_{32} = \Sigma E_{3p} C_{p2}$$
$$= C_{12} + C_{32} + C_{42}$$
$$= 10010 + 00101 + 00000$$
$$= 10111$$

$$N_{33} = \Sigma E_{3p} C_{p3}$$
$$= C_{13} + C_{33} + C_{43}$$
$$= 00000 + 01000 + 00000$$
$$= 01000$$

$$N_{34} = \Sigma E_{3p} C_{p4}$$
$$= C_{14} + C_{34} + C_{44}$$
$$= 01000 + 00000 + 10000$$
$$= 11000$$

$$N_{35} = \Sigma E_{3p} C_{p5}$$
$$= C_{15} + C_{35} + C_{45}$$
$$= 00000 + 01000 + 00000$$
$$= 00100$$

Figure 7D:
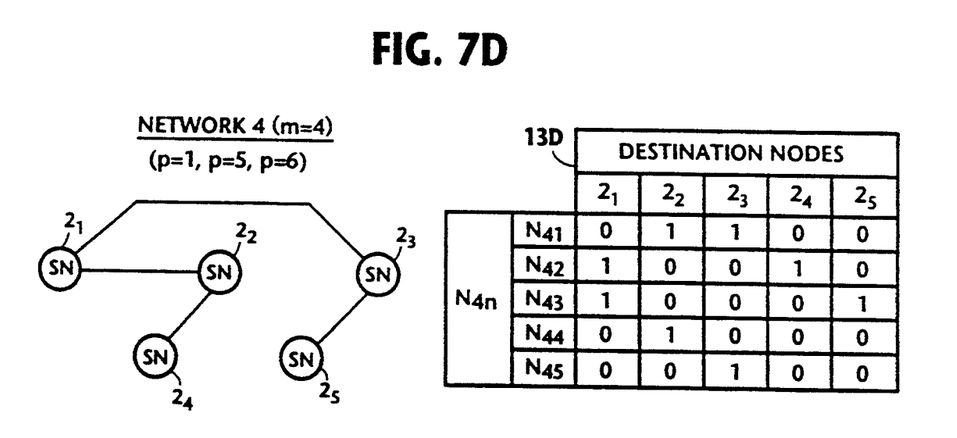

With m=4, network configuration data $N_{41}$ through $N_{45}$ are obtained by the following calculations and stored in table 13D (FIG. 7D):

$$N_{41} = \Sigma E_{4p} C_{p1}$$
$$= E_{41} C_{11} + E_{42} C_{21} + E_{43} C_{31} + E_{44} C_{41} + E_{45} C_{51} + E_{46} C_{61} + E_{47} C_{71}$$
$$= C_{11} + C_{51} + C_{61}$$
$$= 01000 + 00000 + 00100$$
$$= 01100$$

$$N_{42} = \Sigma E_{4p} C_{p2}$$
$$= C_{12} + C_{52} + C_{62}$$
$$= 10010 + 00000 + 00000$$
$$= 10010$$

-continued $$N_{43} = \Sigma E_{4p} C_{p3}$$
$$= C_{13} + C_{53} + C_{63}$$
$$= 00000 + 00001 + 10000$$
$$= 10001$$

$$N_{44} = \Sigma E_{4p} C_{p4}$$
$$= C_{14} + C_{54} + C_{64}$$
$$= 01000 + 00000 + 00000$$
$$= 01000$$

$$N_{45} = \Sigma E_{4p} C_{p5}$$
$$= C_{15} + C_{55} + C_{65}$$
$$= 00000 + 00100 + 00000$$
$$= 00100$$

Figure 7E:
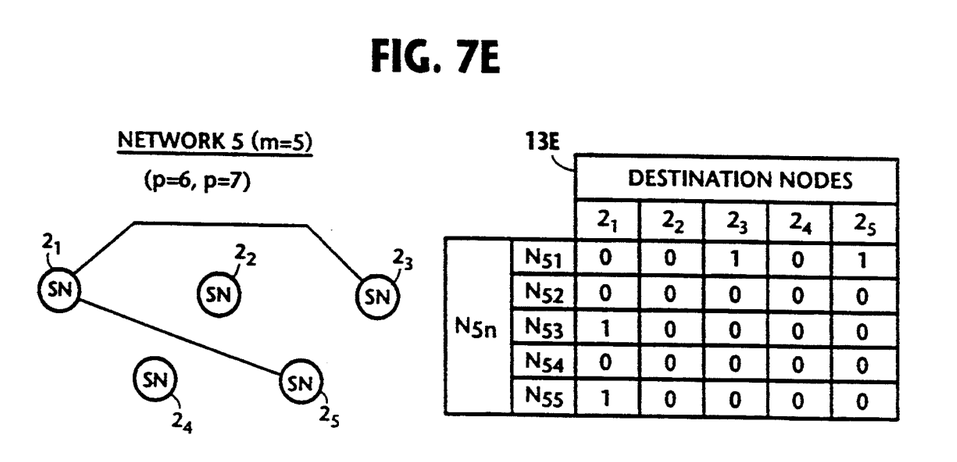

With $m=5$, network configuration data $N_{51}$ through $N_{55}$ are obtained by the following, and stored in table 13E (FIG. 7E):

$$N_{51} = \Sigma E_{5p} C_{p1}$$
$$= E_{51} C_{11} + E_{52} C_{21} + E_{53} C_{31} + E_{54} C_{41} + E_{55} C_{51} + E_{56} C_{61} + E_{57} C_{71}$$
$$= C_{61} + C_{71}$$
$$= 00100 + 00001$$
$$= 00101$$

$$N_{52} = \Sigma E_{5p} C_{p2}$$
$$= C_{62} + C_{72}$$
$$= 00000 + 00000$$
$$= 00000$$

$$N_{53} = \Sigma E_{5p} C_{p3}$$
$$= C_{63} + C_{73}$$
$$= 10000 + 00000$$
$$= 10000$$

$$N_{54} = \Sigma E_{5p} C_{p4}$$
$$= C_{64} + C_{74}$$
$$= 00000 + 00000$$

$$N_{55} = \Sigma E_{5p} C_{p5}$$
$$= C_{65} + C_{75}$$
$$= 00000 + 10000$$
$$= 10000$$

Figure 8A:
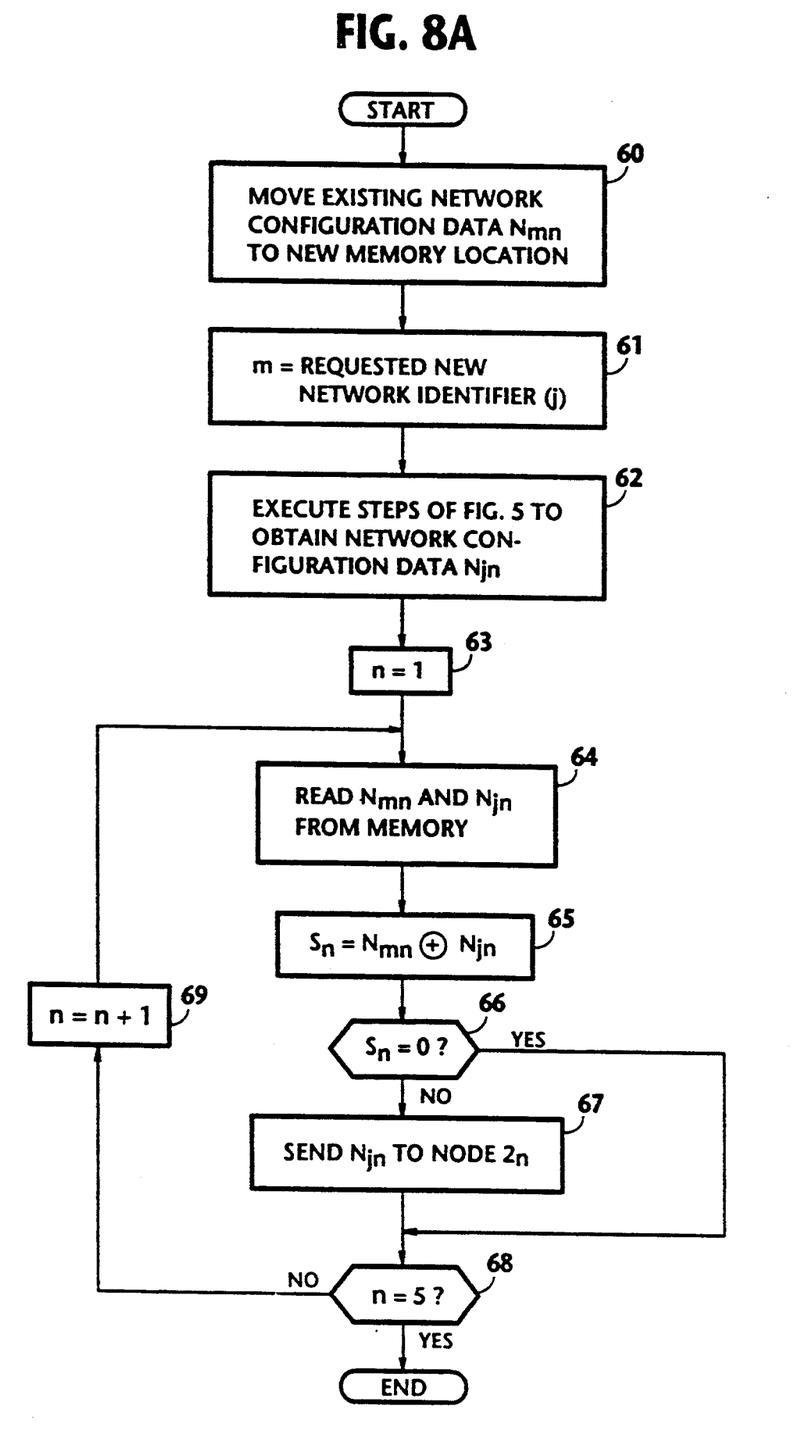
FIG. 8A shows in flowchart a sequence of programmed instructions performed by the controller according to a second embodiment of the present invention.

FIG. 8A is a flowchart according to a second embodiment of the present invention, which is intended to reduce the burden of the switching nodes during system reconfiguration phases by transmitting new network configuration data to those nodes requiring reconfiguration, rather than transmitting them to all switching nodes. If a new network reconfiguration request is made, the program starts with operations step 60 which directs the moving of network configuration data $N_{mn}$, pertaining to the existing network, to a new location of memory 7. Exit then is to step 61 which directs the setting of variable m to the new network identifier (j). Subroutine 62 follows, which directs the executing of the steps of FIG. 5 by skipping step 28 as indicated by line 32 (FIG. 5) to obtain new network configuration data $N_{jn}$. Control exits to step 63 to set variable n equal to 1. Exit then is step 64 to read existing network configuration data $N_{mn}$ and most recent network configuration data $N_{jn}$. Modulo-2 summation is performed bit-by-bit between data $N_{mn}$ and $N_{jn}$ to produce a differential signal $S_n$ (step 65). Control proceeds to step 66 to check to see if $S_n$ is equal to zero. If the answer is affirmative, control exits to step 68 and, if negative, moves to step 67 to send new network configuration data $N_{jn}$ to switching node $2_n$. Step 68 is then executed by checking to see if $n=5$. If the answer is negative, variable n is incremented by 1 (step 69) to repeat the process until $n=5$. Therefore, new network configuration data are sent to those switching nodes needing reconfiguration.

Figure 8B:
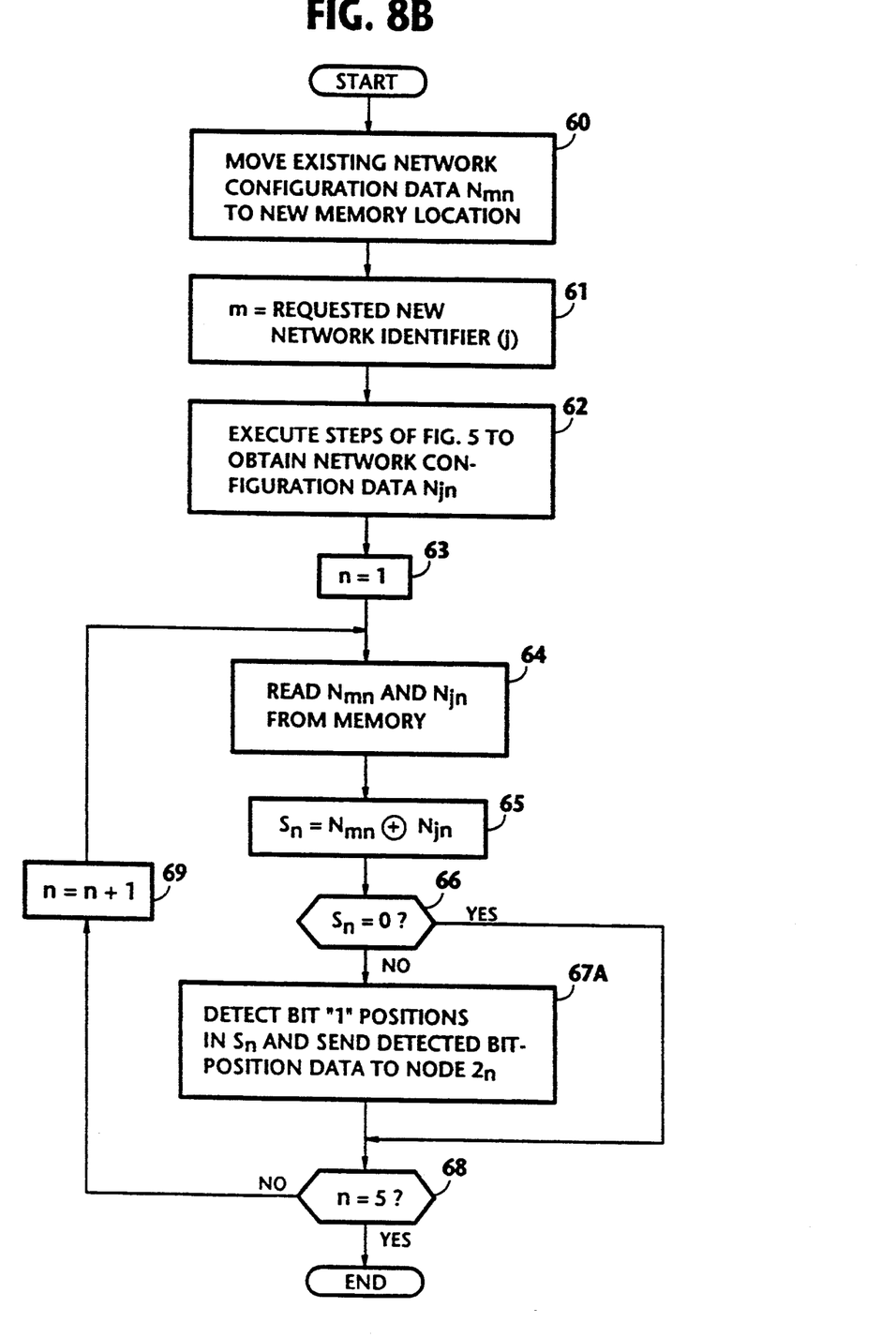
FIG. 8B shows in flowchart a sequence of modified instructions of the second embodiment of the present invention.

The amount of data to be transmitted during network reconfiguration phases can be further reduced by transmitting to those switching nodes requiring network reconfiguration data bits pertaining only to the routes or destinations of such nodes where changes are to be effected. The instructions shown in FIG. 8B are generally similar to those of FIG. 8A except that step 67 of FIG. 8A is replaced with step 67A. Following a decision that $S_n$ is not equal to 0 (step 66), exit is to step 67A in which all bits of differential data $S_n$ are searched for binary "1" which indicates that a route change is to be effected. Bit position data representative of the bit positions in which binary "1" is detected are transmitted via transmitter $8_n$ to switching node $2_n$. On receiving the bit position data, switching $2_n$ checks it against the current states of the links (routes). If the link specified by the bit position data is a regular (currently active) link, it is disconnected from the network and put into the list of spare links. If the specified link is in the list of spares, it is established as a regular link and stricken from the list of spare links.

Figure 9A:
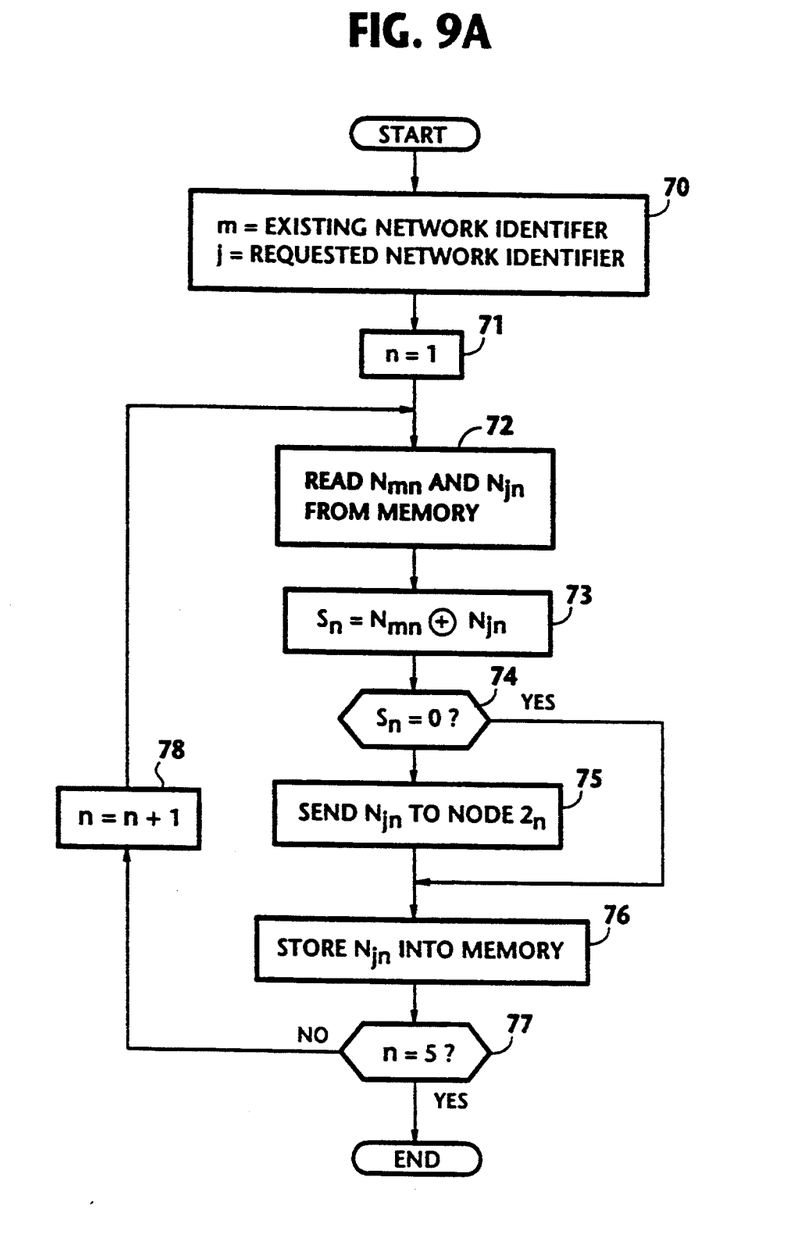
FIG. 9A shows in flowchart a sequence of modified program instructions of the second embodiment.

FIG. 9A is a flowchart according to a modified form of the second embodiment of this invention. According to this modification, network configuration data prepared according to the flowchart of FIG. 6 are utilized for subsequent network reconfigurations.

The program of FIG. 9A is executed in response to a command input indicating a new network identifier. In step 70, variable m is set equal to the identifier of the existing network and variable j is set equal to the new network identifier. Variable n is set to 1 (step 71) and existing and new network configuration data $N_{mn}$ and $N_{jn}$ are recalled from memory 7 (step 72). Modulo-2 summation is performed bit-by-bit between data $N_{mn}$ and $N_{jn}$ to produce a differential signal $S_n$ (step 73). Control proceeds to step 74 to check to see if $S_n$ is equal to zero. If the answer is affirmative, control exits to step 76 and if negative it moves to step 75 to send new network configuration data $N_{jn}$ to switching node $2_n$. Step 77 to store $N_{jn}$ into memory, is then executed by checking to see if $n=5$. If the answer is negative, variable n is incremented by 1 (step 78) and control returns to step 72, to repeat the process until $n=5$.

Figure 9B:
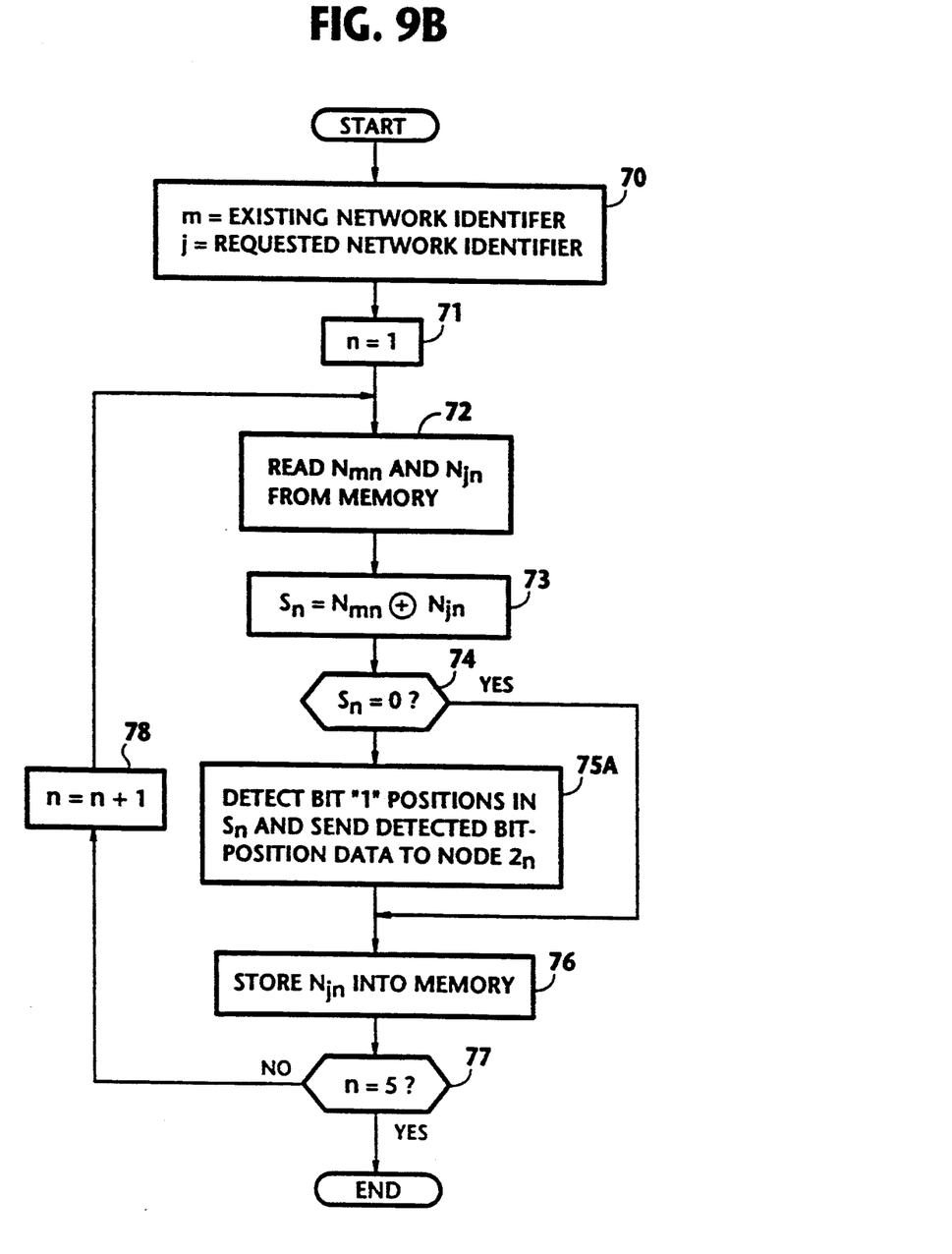
FIG. 9B shows in flowchart a sequence of further modified program instructions of the second embodiment.

The program of FIG. 9A is modified as shown in FIG. 9B, which is similar to FIG. 9A, with the exception that step 75 of FIG. 9A is replaced with step 75A which is identical to step 67A of FIG. 8B. Following a decision that $S_n$ is not equal to 0 (step 74), exit is to step 75A in which all bits of differential data $S_n$ are searched for binary "1" which indicates that a route change is to be effected. Bit position data representative of the bit positions in which binary "1" is detected are transmitted via transmitter $8_n$ to switching node $2_n$. On receiving the bit position data, switching $2_n$ checks it against the current states of the links (routes). If the link specified by the bit position data is a regular (currently active) link, it is disconnected from the network and put into the list of spare links. If the specified link is in the list of spares, it is established as a regular link and stricken from the list of spare links The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. In a communications system having a plurality of switching nodes each being capable of establishing and removing relatively static connections between transmission links in response to network configuration signals and of establishing relatively dynamic connections through the established static connections in response to information pertaining to call-by-call connection requests from user terminals, a network controller comprising:

memory means for storing circuit status bits in a first matrix pattern of rows associated respectively with predefined network configurations and columns associated respectively with predefined circuit configurations, and for storing destination status codes in a second matrix pattern rows associated respectively with said circuir configurations and columns associated respectively with said switching nodes, each of said circuit configurations comprising one or more transmission links, each of the bits stored in each column of the first matrix pattern indicating presence or absence of the circuit configuration associated with the column of the first matrix pattern, and each of said codes indicating presence or absence of transmission links from each switching node to possible destination nodes;

control means for retrieving said circuit status bits from one of said rows of said first matrix pattern and retrieving said destination status codes from each column of said second matrix pattern, respectively multiplying binary values of the retrieved circuits status bits and binary values of the retrieved destination status codes, and summing the multiplied binary values to derive network configuration data for one of said predefined network configurations; and     means for transmitting said network configuration data to said switching nodes as said network configuration signals.

2. In a communications system having a plurality of switching nodes each being capable of establishing and removing relatively static connections between transmission links in response to network configuration signals and of establishing relatively dynamic connections through the established static connections in response to information pertaining to call-by-call connection requests from user terminals, wherein said system includes a network control center having a management console to which a command is entered as an indication of a desired one of a plurality of predefined network configurations, a method comprising the steps of:

a) storing circuit status bits in a first matrix pattern of rows associated respectively with said predefined network configurations and columns associated respectively with predefined circuit configurations, and storing destination status codes in a second matrix pattern of rows associated respectively with said circuit configurations and columns associated respectively with said switching nodes, each of said circuit configurations comprising one or more transmission links, each of the bits stored in each column of the first matrix pattern indicating presence or absence of the circuit configuration associated with the column of the first matrix pattern, and each of said codes indicating presence or absence of transmission links from each switching node to possible destination nodes;

b) respectively multiplying binary values of those of said circuit status bits stored in one of said rows of said first matrix pattern and binary values of those of said destination status codes stored in each column of said second matrix pattern in response to a command entered to said management console;

c) summing the multiplied binary values to derive network configuration data for one of said predefined network configurations; and     d) transmitting said network configuration data to said switching nodes as said network configuration signals.

* * * * *